INVENTOR
Harold L. Barnholdt &
John L. Brown.
ATTORNEY

Oct. 20, 1931. H. L. BARNHOLDT ET AL 1,828,275
FABRICATED CONSTRUCTION
Filed May 17, 1928    2 Sheets-Sheet 2
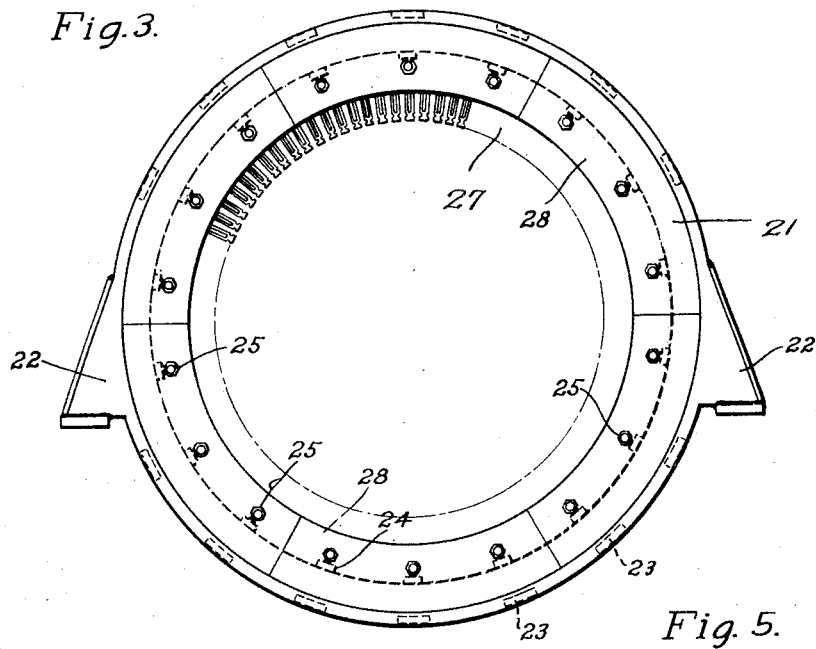
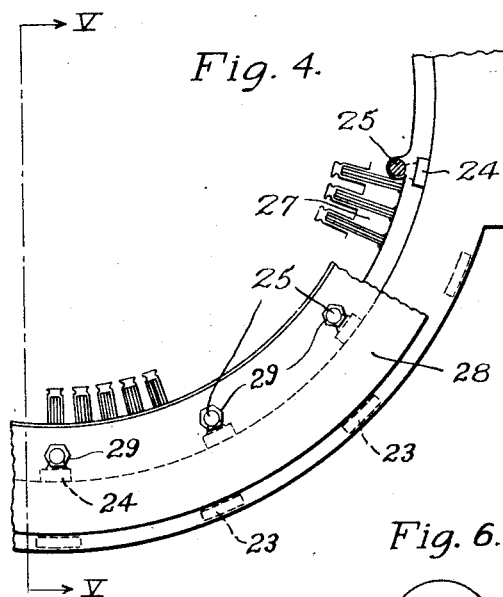
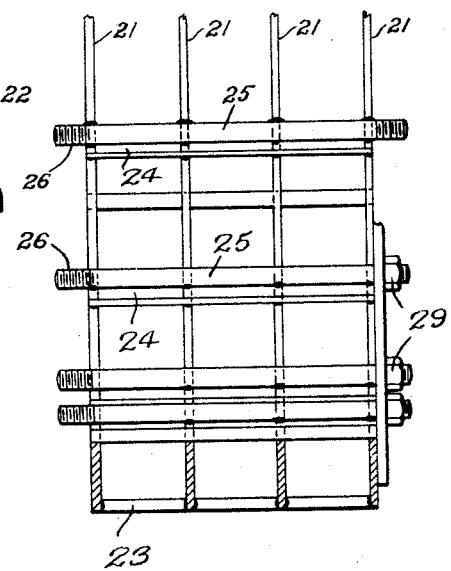
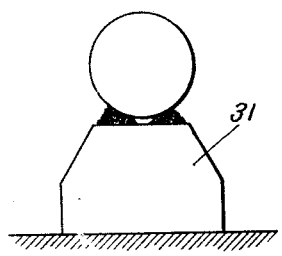
INVENTOR
Harold L. Barnholdt &
John L. Brown.
BY
ATTORNEY Patented Oct. 20, 1931

1,828,275

UNITED STATES PATENT OFFICE

HAROLD L. BARNHOLDT, OF PITTSBURGH, AND JOHN L. BROWN, OF VERONA, PENNSYLVANIA, ASSIGNORS TO WESTINGHOUSE ELECTRIC AND MANUFACTURING COMPANY, A CORPORATION OF PENNSYLVANIA

FABRICATED CONSTRUCTION

Application filed May 17, 1928. Serial No. 278,396.

Our invention relates to stator frames for dynamo-electric machines, and more particularly to a means for securing the core punchings therein.

Heretofore, core punchings have been secured to stator frames by a means, the provision of which, has required a great deal of time for machining operations. For instance, dovetail slots have been made in the longitudinally disposed portions of the frame, in which the dovetail projections on the outer peripheries of the punchings are disposed. This construction provides a fair method, but, in the development of frames of fabricated construction wherein steps have been undertaken, to produce a cheaper, yet a more durable frame, the cost of the machining operation has been a large item of expense.

In other structures, core punchings have been supported on bolts or rods which extend through holes in the punchings and through holes in the spaced end portions of the frame. The use of bolts is desirable, since no machining other than boring operations in the frame, is required. However, such construction is impracticable in large machines having long cores, since it is impossible to build up cores loosely on bolts and thus obtain a laminated structure that is concentric or true with the air gap line. Further disadvantages are also apparent in the use of bolts for long cores. The bolts have to be increased in diameter, as well as in length, in order to make them adaptable to the long core, or, otherwise, without substantial increase of diameter, the bolts would bend under the load. Also, the presence of bolts in the flux path of these large machines having high flux density, is undesirable.

In practicing our invention, bolts or rods, adaptable to receive recesses in the outer peripheries of the core punchings, are welded at a plurality of points along the edge of longitudinally disposed members that hold the annular-shaped end plates in spaced relation.

It is the principal object of our invention to provide a stator frame with a means for securing the core punchings, in the construction of which, the dovetailing and boring operations that were necessary heretofore are eliminated.

It is another object of our invention to provide stator frames wherein bolts or rods may be utilized for long cores, as well as for short cores, without having to be substantially increased in diameter to withstand the weight of the additional core punchings.

It is another object of our invention to provide a means for securing core punchings to a stator frame, whereby the carrying bolts or rods are not entirely within the flux path.

Our invention resides in the arrangement of the structural parts in a stator frame in which is provided a novel means for securing the core punchings.

For a better understanding of our invention, reference may be had to the accompanying drawings, in which, Figure 1 is a view, in elevation, of a stator frame constructed in accord with our invention.

Fig. 3 is an elevational view of a stator frame of another type embodying a modified form of our invention;

Fig. 4 is an enlarged elevational view of a portion of the stator frame shown in Fig. 3;

Fig. 5 is a longitudinal view of the stator frame taken on line V—V of Fig. 4; and Fig. 6 is a detail view showing an improved spacing member which is preferred in practicing our invention.

Figure 1:
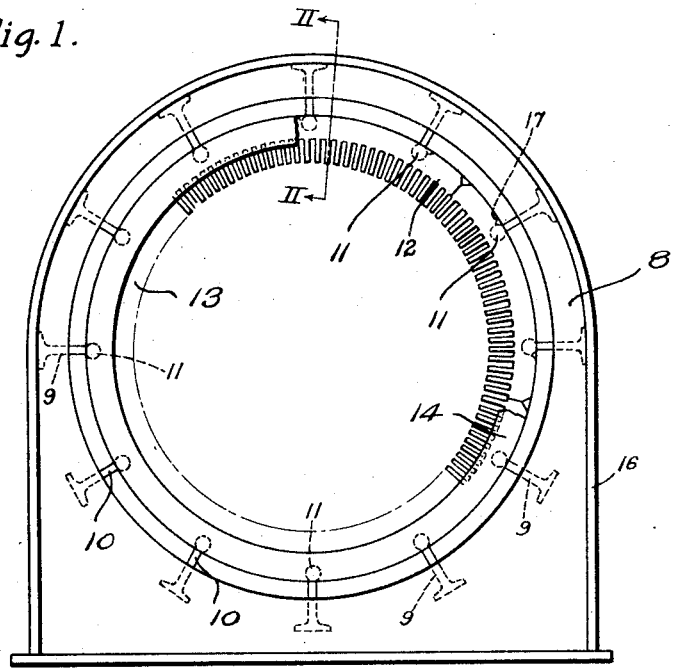
Figure 2:
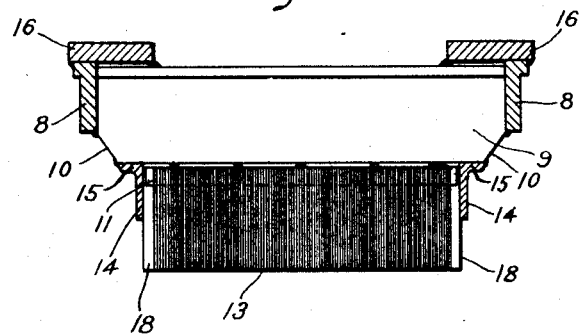
Fig. 2 is a sectional view, taken along the line II—II of Fig. 1, showing, in detail, the arrangement of the structural parts.

In Fig. 1, is shown substantially annular plates 8 that are butt-welded to the ends of a plurality of longitudinal spacing members 9 which have a cross section of T-shape, with a portion 10 extending inwardly beyond the inner periphery of annular plates 8. The spacing members 9 have bolts or rods 11 welded thereto, preferably as shown in Fig. 2, which, in turn, carry the segmental core punchings 12 of the laminated core 13. The core punchings 12 are stacked on the bolts 11, and are maintained in face-to-face relation by end-holding rings 14 each of which has a flange 15 which is secured to the ends of the spacing members 9. A band or arcuate-shaped piece 16 is bent over the outer edge of each of the annular plates 8 and is secured to both the spacing members and the plates to strengthen the structure.

The core punchings may have circular-shaped recesses in the outer peripheries thereof, which necessitates that they be slipped over the ends of the bolts 11, but it is preferred that they have improved recesses, such as are described in a copending application of Thomas Noden, Serial No. 286,001, filed June 16, 1928, and assigned to the Westinghouse Electric & Manufacturing Company, wherein one side of the circular recess of the punching is cut away, as shown at 17, to provide a mouth opening whereby the punching may be assembled from a point near to its final position, instead of having to assemble it from the ends of the rods.

The bolts 11 are preferably welded, in the manner shown in Fig. 2, at a plurality of points in order to minimize the amount of heating and thereby prevent any distortion of the bolts. Bolts of cold-rolled steel are more sensitive to heat, since they are case hardened and, upon heating, stresses that are not uniform, are set up. However, by only applying heat at a few points, very little trouble is encountered.

In the assembly of our stator frame, one of the end holding rings 14 may be permanently attached to the spacers and utilized as a shelf on which to build up the core 13. The usual finger-supporting plates 18 are utilized on the ends of the core.

In Figs. 3, 4 and 5, is illustrated another type of a stator frame where a different means of holding the laminations in face-to-face relation is employed. These figures show a plurality of ring-shaped plates 21 having feet portions 22 thereon which are held in spaced relation by rib members 23 that are disposed in the outer edges of the plates and by rib members 24 that are disposed in the inner edges of the plates.

Bolts 25, having threaded end portions 26, are welded to the rib members 24 in such manner that the threaded portions extend outwardly beyond the outer rings 21. Core punchings 27 are disposed on the rods and are held in place by segmental end pieces 28 which are disposed over the threaded end portions and tightened against the side of the assembled punchings by nuts 29.

In practicing our invention, it was found difficult at first, to get good welds between the bolts 25 and the rib members 24. It was found that the best way to hold the rods in place during the welding operation was by providing a grooved piece which might be disposed over the bolt so that the bolt could be held between walls of the groove, thus preventing any warping which might occur during the welding. The edges of this member, when disposed over the bolt, took up much room so that, in order to get the welding torch under the bolt, it became necessary to provide an improved rib member 31, such as that shown in Fig. 6, in which the edges were chamfered or beveled.

It is not desired that the application of our invention be limited to stator frames of the fabricated type, for it is obvious that it could be readily applied to cast frames as well.

By our invention, we have shown a fabricated stator frame whereby bolts may be used for supporting the core punchings, without any regard as to the proposed length of the machine. By so utilizing bolts, we have provided a structure whereby we eliminate the boring and dove-tail operations which were necessary heretofore.

Certain features herein shown, including the threaded-joint connection 26, are also described and claimed in an application of R. A. McCarty, Serial No. 366,481, filed May 27, 1929, and assigned to the Westinghouse Electric and Manufacturing Company.

It will be understood that various modifications may be made in our invention without departing from the spirit and scope, as defined by the appended claims.

We claim as our invention:

1. In a dynamo-electric machine, a fabricated stator frame comprising a plurality of annular-shaped plates, a plurality of longitudinally disposed members spacing said plates, round rods secured longitudinally along the inner edge of said longitudinal members, core laminations carried by said rods, and means for holding said laminations in face-to-face relation.

2. In a dynamo-electric machine, a fabricated stator frame comprising a plurality of annular-shaped members, a plurality of spacing members disposed with their longitudinal axes perpendicular to said annular-shaped members and fastened to said plate members at points of equal circumferential distance apart, a portion on each of said spacing members extending inwardly beyond the inner edges of said annular-shaped members, rods of cold-rolled steel secured to said portions, core laminations disposed on said rods, and means for holding said laminations on said rods comprising members secured to said portions.

3. In a dynamo-electric machine, a fabricated stator frame comprising a plurality of ring-shaped plates, a plurality of spacing members being T-shape in cross-section, and disposed with the top edge of said spacing members near to the outer periphery of said plates, cold-rolled steel rods welded along the bottom edge of said spacing members, core laminations disposed along said rods, means for holding said laminations in face-to-face relation, and arcuate shaped members welded to the outer periphery of each of said plates and to the top edge of said spacing members.

4. In a dynamo-electric machine, a stator frame comprising a plurality of ring-shaped members, a plurality of spacing members disposed with their longitudinal axes perpendicular to said ring-shaped members and having a round tenon portion disposed along the inner edge thereof, core laminations morticely engaging with said tenon, and means for holding said laminations in face-to-face relation.

5. In a dynamo-electric machine, a fabricated stator frame comprising a plurality of annular-shaped plates, a plurality of supporting members for maintaining said plates in spaced relation, round rods molecularly integral at a plurality of points along the inner edge of said supporting members, segmental core laminations disposed along said rods, means for holding said laminations in face-to-face relation comprising end rings having a flanged outer periphery that is welded to said supporting members, and cylindrically-shaped members welded to the outer periphery of said plates and to said supporting members.

6. In a dynamo-electric machine, a fabricated stator frame comprising two plate members, a plurality of spacing members disposed between said plates with their longitudinal axes perpendicular thereto and the ends butt-welded to said plates, round rods of cold-rolled steel welded with their longitudinal edges parallel to the axes of said spacing member, core laminations supported by said rods, and supporting rings for maintaining said lamination in face-to-face relation and being welded to said spacing members, and arcuate-shaped members welded to outer rims and feet portions of said plates and to the spacing members.

7. In a dynamo-electric machine, a fabricated stator frame comprising a plurality of annular-shaped plates, means for holding said plates in spaced relation, round rods secured to said spacing means, core laminations carried by said rods, and means for holding said laminations in face-to-face relation.

In testimony whereof, we have hereunto subscribed our names this 12th day of May, 1928.

HAROLD L. BARNHOLDT.
J. L. BROWN.